United States Patent [19]
Augustine et al.

[11] Patent Number: 5,810,309
[45] Date of Patent: Sep. 22, 1998

[54] NATURAL GAS CYLINDER MOUNTING ASSEMBLY FOR A NATURAL GAS VEHICLE, AND THE METHOD OF INSTALLATION

[75] Inventors: Stanley J. Augustine, Horseheads; John W. Richardson, Glen Aubrey; Kenneth W. Ham, Pine City; Robert W. Stiles, Apalachin, all of N.Y.

[73] Assignee: New York State Electric & Gas Corporation, Binghamton, N.Y.

[21] Appl. No.: 780,160

[22] Filed: Dec. 26, 1996

[51] Int. Cl.⁶ .......................................................... A47K 1/08
[52] U.S. Cl. .......................... 248/313; 280/838; 248/154
[58] Field of Search .................................. 248/313, 154, 248/201, 205.1, 58; 280/838, 834

[56] References Cited

U.S. PATENT DOCUMENTS

| | | | |
|---|---|---|---|
| 1,411,378 | 4/1922 | Robison . | |
| 2,410,182 | 10/1946 | Prior . | |
| 2,758,845 | 8/1956 | Doyle et al. . | |
| 4,357,027 | 11/1982 | Zeitlow . | |
| 4,846,499 | 7/1989 | Izumi et al. ............................. | 280/830 |
| 5,346,165 | 9/1994 | Frean et al. ........................... | 248/154 X |
| 5,380,042 | 1/1995 | Hively et al. ............................. | 280/834 |
| 5,443,578 | 8/1995 | Davis, Jr. .................................. | 280/834 |
| 5,518,272 | 5/1996 | Fukagawa ................................ | 280/834 |
| 5,570,865 | 11/1996 | Godfrey ............................... | 248/300 X |
| 5,607,133 | 3/1997 | Markham et al. .................. | 248/154 X |
| 5,658,013 | 8/1997 | Bees et al. ........................... | 280/834 X |

*Primary Examiner*—Ramon O. Ramirez
*Attorney, Agent, or Firm*—Roylance,Abrams,Berdo & Goodman, L.L.P.

[57] ABSTRACT

A compressed natural gas cylinder mounting assembly is disclosed for supporting and coupling a compressed natural gas cylinder to the underside of a natural gas vehicle. The compressed natural gas cylinder mounting assembly has a pair of mounting bracket assemblies with one mounting bracket assembly coupled to each end of the compressed natural gas cylinder. Each of the mounting bracket assemblies has a pair of structural beams which are coupled to the underside of the vehicle and a pair of vertical mounting plates coupled to the ends of the structural beams and then attached to the underside of the vehicle. Each of the mounting brackets includes a cylinder brace with a pair of clamping bands for engaging and encircling the compressed natural gas cylinder. In an alternate embodiment, the structural beams are extendible.

23 Claims, 5 Drawing Sheets

NATURAL GAS CYLINDER MOUNTING ASSEMBLY FOR A NATURAL GAS VEHICLE, AND THE METHOD OF INSTALLATION

FIELD OF THE INVENTION

The present invention relates to a mounting assembly for supporting and coupling a compressed natural gas cylinder to the underside of a natural gas vehicle. More specifically, the mounting assembly is especially designed for retrofitting a vehicle with a compressed natural gas cylinder such that the mounting assembly adds rigidity to the vehicle.

BACKGROUND OF THE INVENTION

Currently, most vehicles operated today use liquid hydrocarbon fuels such as gasoline or diesel fuel. However, these types of fuels have certain drawbacks. One of the main drawbacks of these types of fuels is that these types of fuels are limited in supply throughout the world and are concentrated in certain areas of the world. Another drawback of such liquid hydrocarbon fuels is that the exhaust emissions from the vehicles have an adverse effect on the environment.

Moreover, since the number of vehicles being operated in this world is continuing to increase, there has been an increased concern regarding worldwide air pollution from vehicles. In order to control this air pollution problem from vehicles, many countries have begun to regulate the exhaust emissions from vehicles. In fact, the exhaust emissions standards are constantly becoming more strict each year.

In view of these increasingly stricter emissions requirement, vehicle manufacturers have begun to develop alternative methods of powering vehicles. For example, vehicle manufacturers are beginning to develop electric powered vehicles. However, electric powered vehicles have many drawbacks compared to conventional gasoline or diesel powered fuels. One drawback is that electric vehicles typically have a very limited range of travel before their batteries need to be recharged. Another drawback of electric vehicles is that the battery tends to have a very short useful life before requiring expensive refurbishing. Moreover, electric vehicles do not have the performance of conventional gasoline or diesel fuel powered vehicles. In view of these drawbacks, electric vehicles have not become very popular.

Another alternative form of transportation is a natural gas vehicle. Natural gas vehicles have many advantages over liquid hydrocarbon fuels, such as gasoline and diesel, in that they are cheaper to run as well as cleaner to operate. Moreover, natural gas is readily available in the United States and can be used to operate most internal combustion engines with certain modifications thereto. Unlike electric vehicles, natural gas vehicles do not significantly differ in performance from gasoline and diesel type vehicles. In fact, most gasoline vehicles can be retrofitted to become a natural gas vehicle.

Due to the relative ease of retrofitting existing gasoline vehicles and due to the cheaper cost of operating a natural gas vehicle over a gasoline type vehicle, many fleet operators have converted their fleet of vehicles from gasoline to natural gas. One problem in converting an existing gasoline vehicle to a natural gas vehicle is the mounting of the compressed natural gas cylinder to the vehicle. In particular, the framing of the vehicle must often be cut to accommodate the natural gas cylinder. Of course, cutting the framing of the vehicle comprises the structural integrity of the vehicle. Accordingly, various mounting assemblies have been developed for mounting a natural gas cylinder to the vehicle.

Examples of a mounting structure for attaching a compressed natural gas tank to a vehicle are disclosed in U.S. Pat. Nos. 5,443,578 to Davis, Jr. and 5,518,272 to Fukagawa et al.

In view of the above noted problems with existing liquid hydrogen vehicles and with retrofitting such vehicles with a natural gas cylinder, there exists a need for a compressed gas cylinder mounting assembly which provides additional rigidity to the vehicle. This invention addresses this need in the prior art as well as other needs and problems which will become apparent those skilled in the art from this disclosure.

SUMMARY OF THE INVENTION

One object of the present invention is to provide a natural gas cylinder mounting assembly which enhances the rigidity of a vehicular body.

Another object of the present invention is to provide a natural gas cylinder mounting assembly which provides maximum road clearance between the road and the bottom of the natural gas cylinder tank.

Another object of the present invention is to provide a natural gas cylinder mounting assembly which is relatively inexpensive to manufacture.

Still another object of the present invention is to provide a natural gas cylinder mounting assembly which is relatively simple to install on an existing vehicle.

The foregoing objects are basically attained by providing a natural gas cylinder mounting assembly for supporting a natural gas cylinder coupled to an underside of a vehicle, comprising a first support member adapted to be coupled to the underside of the vehicle, the first support member including a first structural beam having a first end and a second end with a longitudinal axis extending therebetween, and a first mounting member rigidly coupled to the first end of the first structural beam and extending substantially perpendicular to the first structural beam; a first cylinder brace rigidly coupled to the first support member, the first cylinder brace including a pair of first clamping bands with curved surfaces which engage a first end of the natural gas cylinder; a second support member adapted to be coupled to the underside of the vehicle, the second support member including a second structural beam having a first end and a second end with a longitudinal axis extending therebetween, and a second mounting member rigidly coupled to the first end of the second structural beam and extending substantially perpendicular to the second structural beam; and a second cylinder brace rigidly coupled to the second support member, the second cylinder brace including a pair of second clamping bands with curved surfaces which engage a second end of the natural gas cylinder.

The foregoing objects are also basically attained by providing a method of attaching a compressed gas cylinder to an underside of a vehicle with at least one longitudinally extending main beam and at least one transversely extending cross beam supporting a vehicle body, the method comprising the steps of removing a portion of the cross beam for providing space to mount the compressed gas cylinder; attaching a mounting assembly to the main beam and the vehicle body which increases the rigidity of the vehicle to compensate for the removed portion of the cross beam, the step of attaching the mounting assembly including the steps of coupling a first structural beam to the underside of the vehicle, the first structural beam having a first end and a second end with a longitudinal axis extending therebetween, coupling a first mounting member to the main beam of the vehicle adjacent the first end of the first structural beam and extending substantially perpendicular to the first structural beam; coupling a first part of a first cylinder brace between the first structural beam and the first mounting member; coupling a second structural beam to the underside of the vehicle, the second structural beam having a first end and a second end with a longitudinal axis extending therebetween, coupling a second mounting member to the main beam of the vehicle adjacent the first end of the second structural beam and extending substantially perpendicular to the second structural beam; coupling a first part of a second cylinder brace between the second structural beam and the second mounting member, placing the compressed gas cylinder against the first parts of the first and second clamping braces; coupling a second part of the first cylinder brace to the first part of the first cylinder brace to engage a first end of the compressed gas cylinder; and coupling a second part of the second cylinder brace to the first part of the second cylinder brace to engage a second end of the compressed gas cylinder.

Other objects, advantages, and salient features of the invention will become apparent from the following detailed description which, taken in conjunction with the annexed drawings, discloses preferred embodiments of the invention.

BRIEF DESCRIPTION OF THE DRAWINGS

Referring now to the drawings which form part of this original disclosure.

DETAILED DESCRIPTION OF THE PREFERRED EMBODIMENTS

Figure 1:
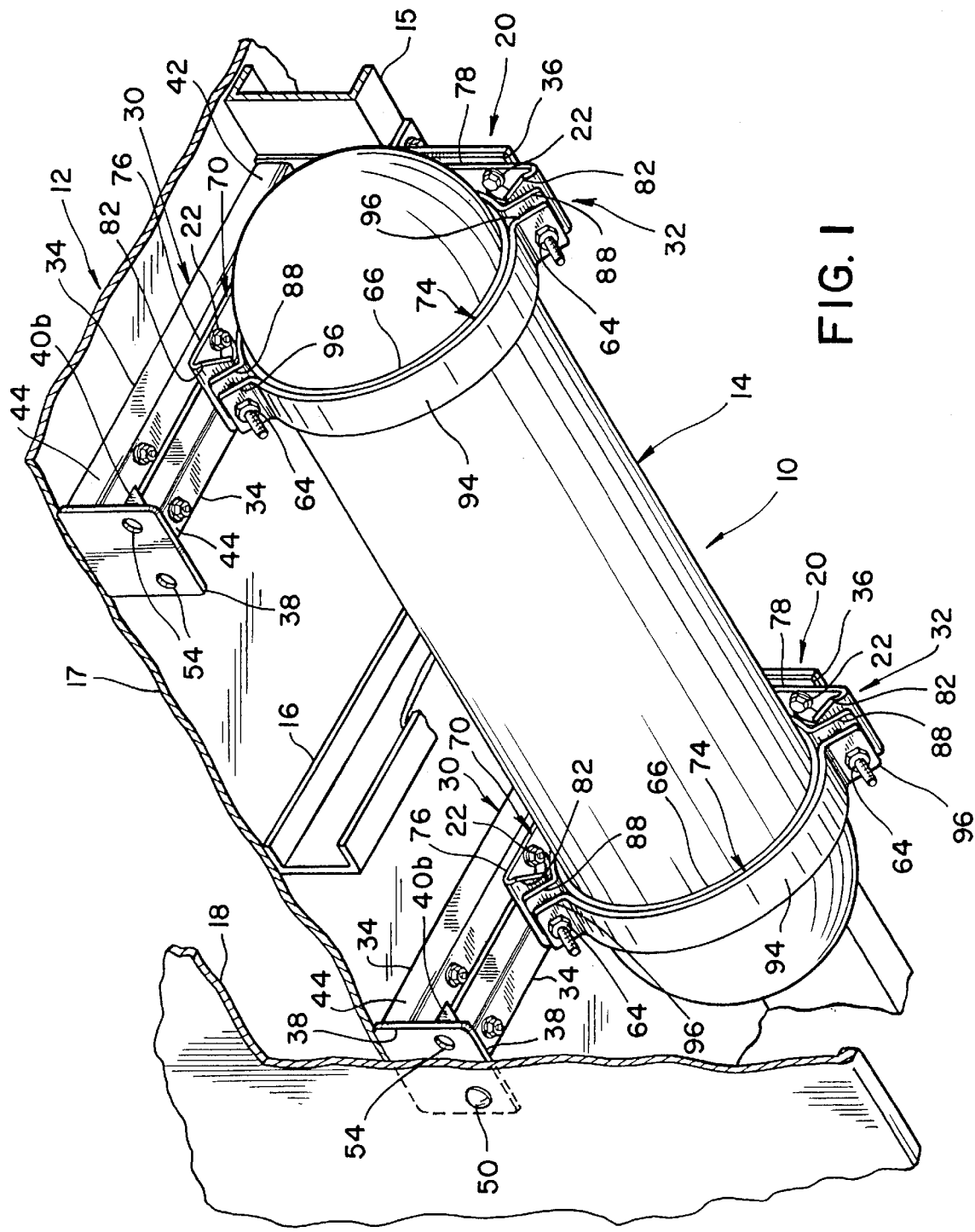
FIG. 1 is a partial perspective view of an underside of a natural gas vehicle, with certain portions broken away to illustrate a compressed natural gas cylinder or tank mounted thereon via a mounting assembly in accordance with the present invention.
Figure 2:
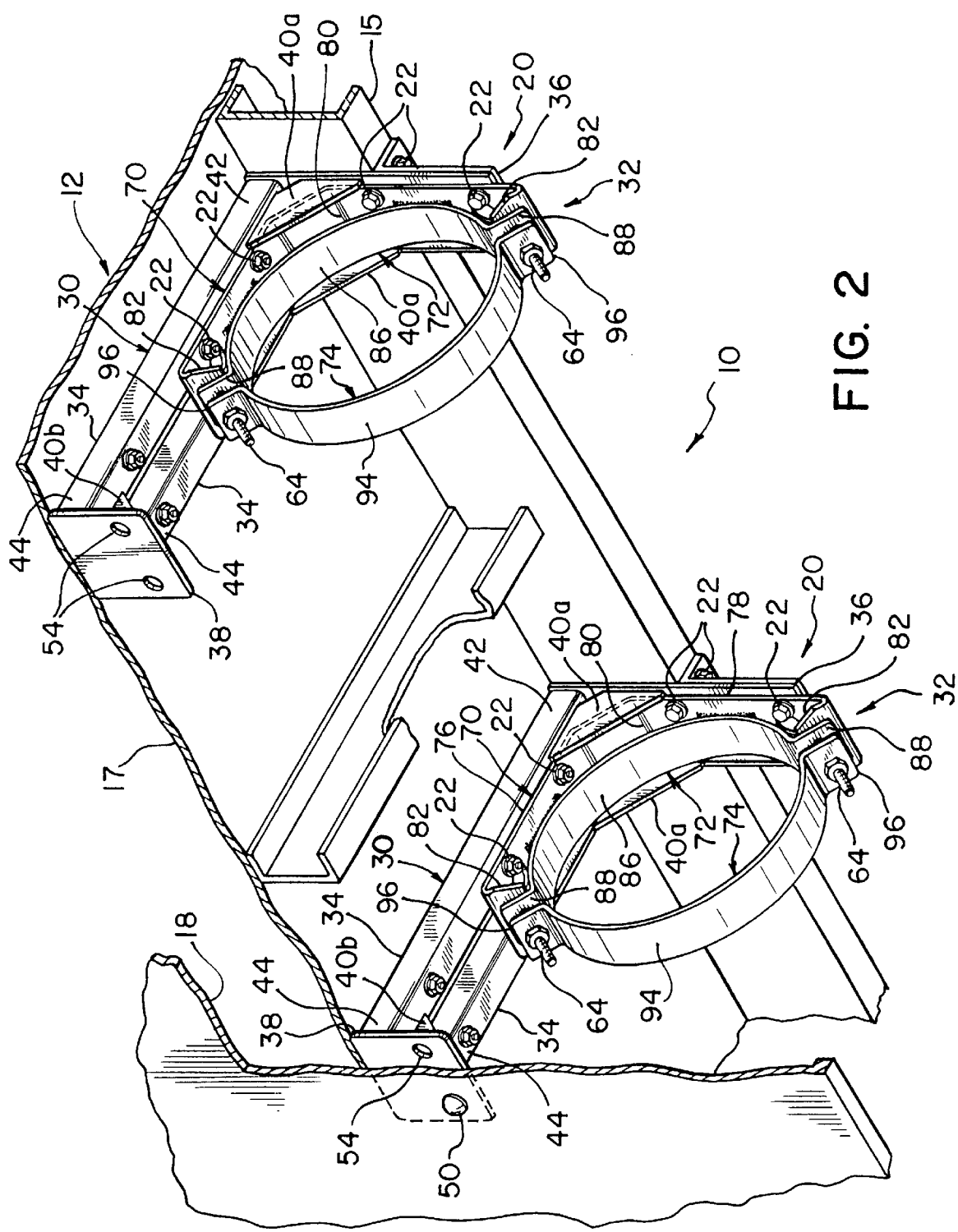
FIG. 2 is a partial perspective view of the underside of a natural gas vehicle and the mounting assembly in accordance with the present invention, similar to FIG. 1, except that the compressed natural gas cylinder has been removed.
Figures 3, 4:
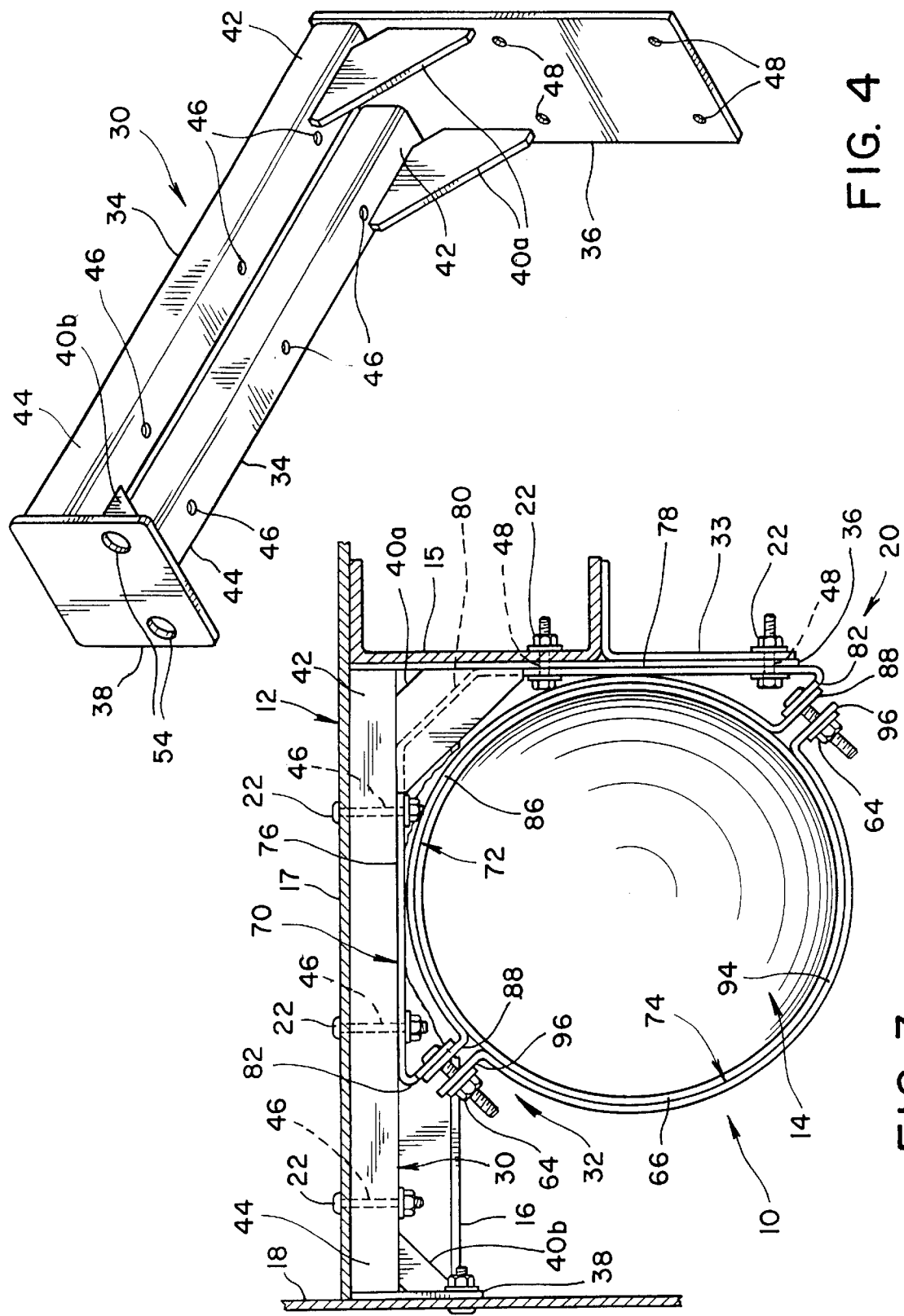
FIG. 3 is an end elevational view of a compressed natural gas cylinder mounted to the underside of a natural gas vehicle by the mounting assembly in accordance with the present invention.
FIG. 4 is a bottom side perspective view of one of the support members of one of the mounting brackets with its cylinder brace removed.
Figures 5, 6:
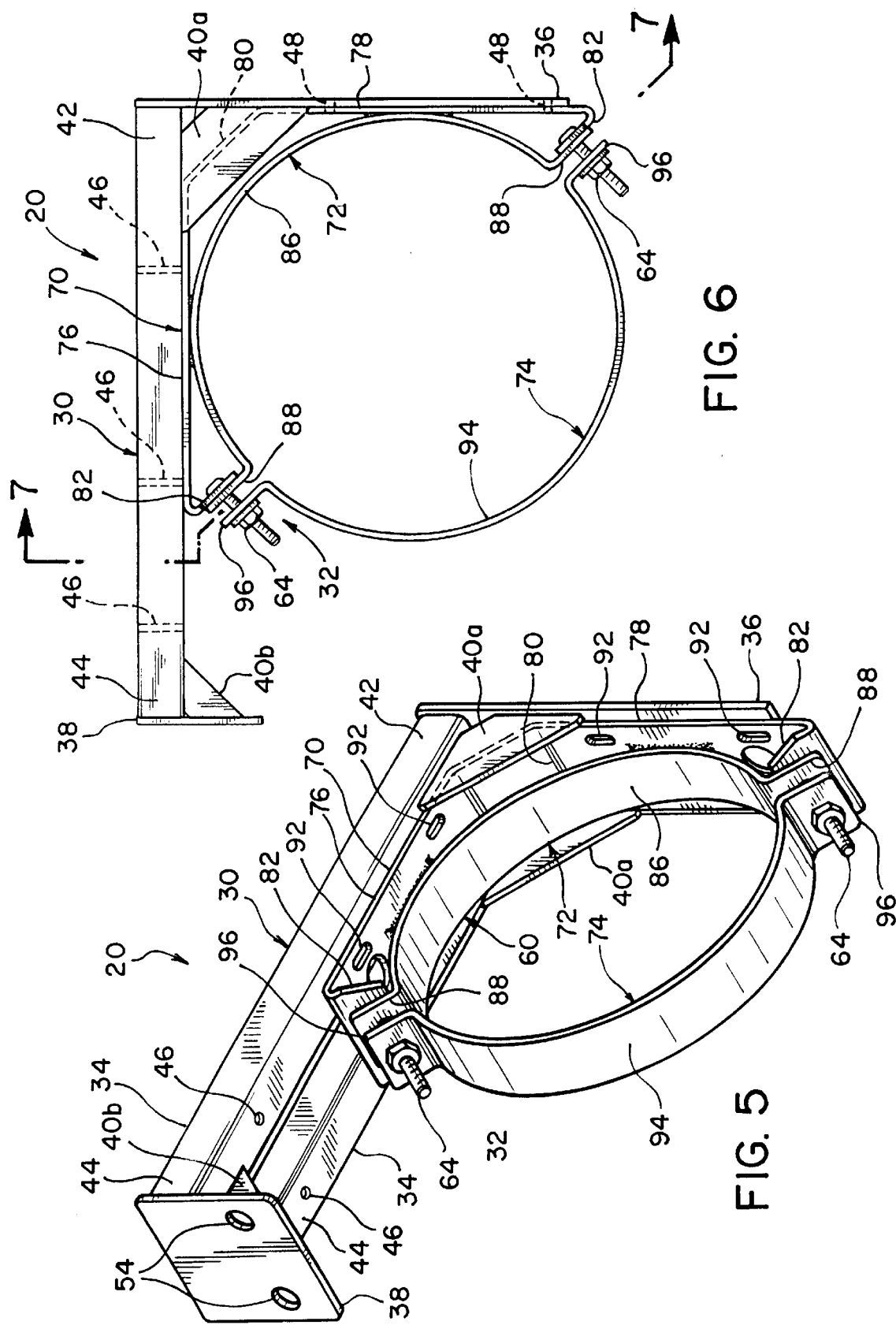
FIG. 5 is a bottom side perspective view of one of the mounting brackets in accordance with the present invention.
FIG. 6 is a side elevational view of the mounting bracket illustrated in FIG. 5.
Figure 9:
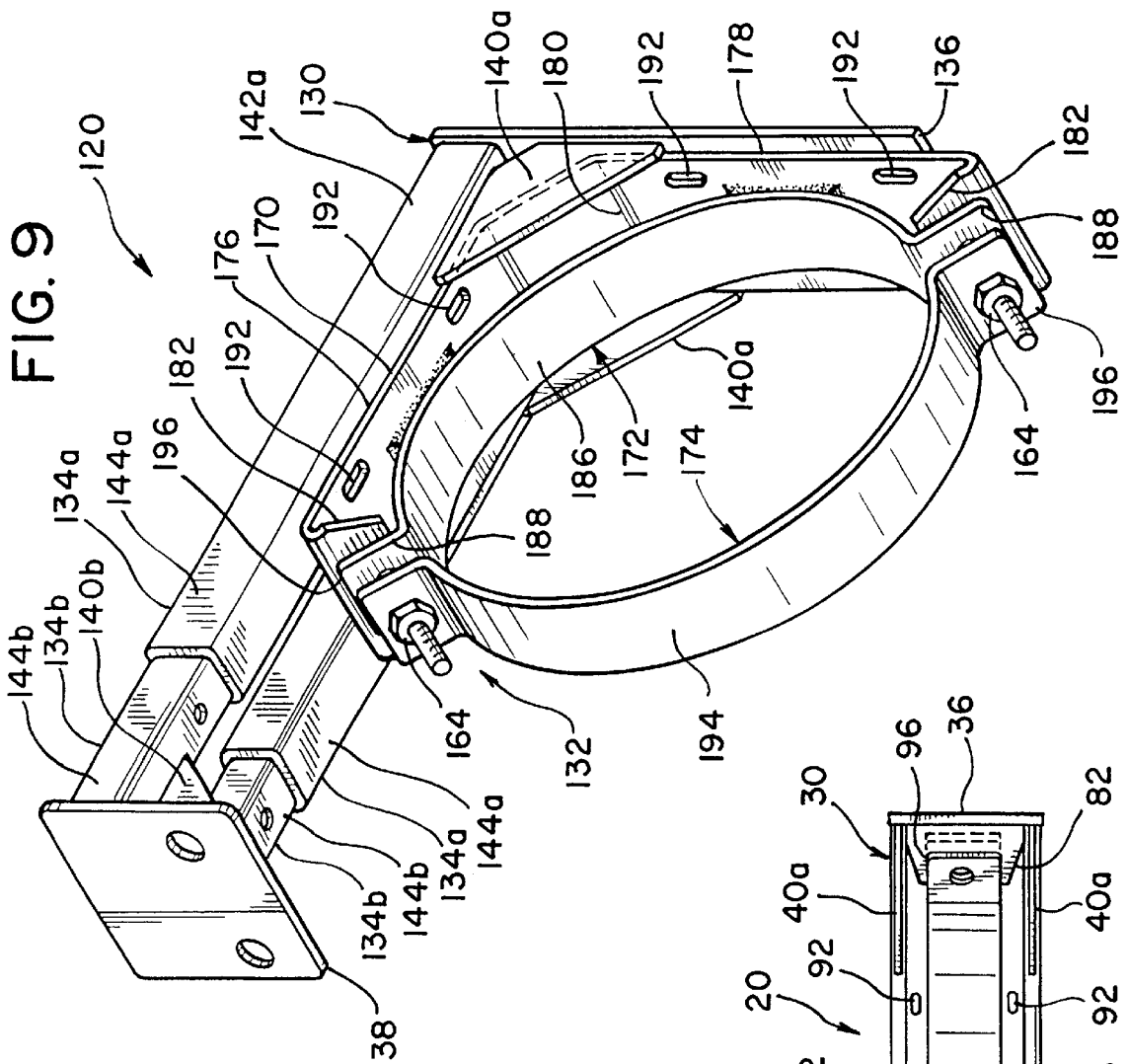
FIG. 9 is a perspective view of a mounting assembly in accordance with a second embodiment of the present invention.
Figure 7:
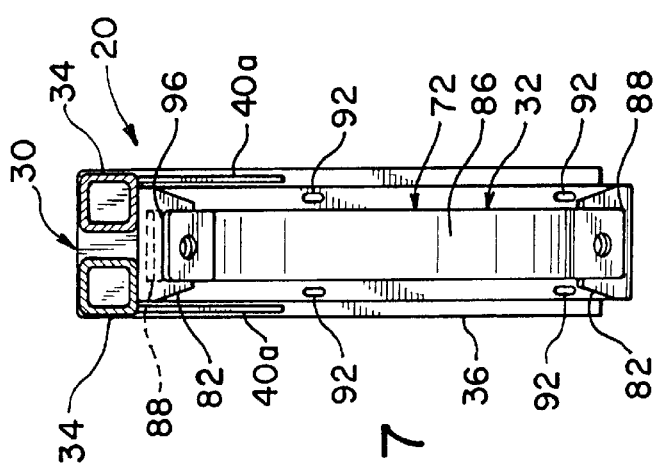
FIG. 7 is a cross-sectional view of the mounting bracket illustrated in FIGS. 5 and 6 taken along section line 7—7 of FIG. 6.

Referring initially to FIGS. 1–3, a compressed natural gas cylinder mounting assembly 10 in accordance with a first embodiment of the present invention is illustrated. Mounting assembly 10 is attached to the underside of a natural gas vehicle 12 for supporting a compressed natural gas cylinder or tank 14 thereto. While vehicle 12 can be a variety of vehicles, mounting assembly 10 as illustrated herein is especially useful in retrofitting for natural gas a P-50 style truck, i.e., a step or bread van style vehicle, which is often utilized by United Parcel Post (UPS).

Compressed natural gas cylinder 14 is a conventional compressed natural gas cylinder. Since compressed natural gas cylinders are well known in the art, compressed natural gas cylinder 14 will not be discussed or illustrated in detail herein. Moreover, the retrofit kit for converting a gasoline fueled vehicle into a compressed natural gas vehicle will not be discussed or illustrated in detail herein, since the conversion kit is not part of the present invention and such technology is well known in the art. In any event, the assignee of the present invention, New York State Electric & Gas Corporation, has a natural gas vehicle conversion kit which includes two stages of regulation of the compressed natural gas, a mixture assembly to introduce natural gas into the engine, a dash mounted fuel gage and supporting electronics to interface with the OEM's computer. New York State Electric & Gas's system is a closed loop fuel control system which reduces tail pipe emissions, increases fuel economy and reduces engine wear.

For purposes of explaining and illustrating the present invention, mounting assembly 10 will be described and illustrated as being used with a step or bread van style vehicle, but of course, the present invention should not be limited to such a vehicle. Moreover, only those parts of vehicle 12 which are necessary to the understanding of the present invention will be discussed and illustrated herein, i.e., the framing and the body of vehicle 12.

The framing of vehicle 12 typically includes a pair of longitudinally extending main beams 15 (only one shown) and a plurality of transversely extending cross members 16 (only one shown) fixedly coupled to main beams 15 and extending substantially perpendicular thereto. Main beams 15 and cross members 16 support the body of vehicle 12 in a conventional manner. The body of vehicle 12 typically includes a substantially horizontally extending floor or bed 17 and a substantially vertically extending body panel or skirt 18.

Mounting assembly 10 supports compressed natural gas cylinder 14 to the underside of vehicle 12 via the framing and the body of vehicle 12. In particular, mounting assembly 10 is coupled to one of the main longitudinally extending beams 15 of vehicle 12 as well as to the bed 17 and body skirt 18 of vehicle 12. Installation of compressed natural gas cylinder 14 to the underside of vehicle 12 typically requires a portion of one or more of the cross members 16 of vehicle 12 to be cut away to accommodate compressed natural gas cylinder 14. The removal of portion of the cross member 16 provides for additional road clearance between the road and the bottom of compressed natural gas cylinder 14. However, once a portion of cross member 16 is removed, the structural integrity of the frame and body of vehicle 12 has been compromised. Mounting assembly 10 is designed to compensate for this loss of structural integrity due to the removal of portion of cross member 16.

Mounting assembly 10 basically includes a pair of substantially identical mounting brackets 20 which are attached to the underside of vehicle 12 as explained in more detail below. Since mounting brackets 20 are substantially identical, like reference numerals will be utilized to describe each of the mounting brackets 20. Preferably, mounting brackets 20 are fixedly coupled to the underside of vehicle 12 via fasteners 22 which are preferably nuts and bolts such as ½ inch bolts with self-locking nuts. Of course, other methods of fastening mounting brackets 20 can be utilized such as welding.

Each mounting bracket 20 includes a support member 30 for improving the structural integrity of the frame and body of vehicle 12, and a cylinder brace 32 coupled to support member 30 for securing compressed natural gas cylinder 14 to support member 30. Preferably, fasteners 22, which are utilized to couple each of the mounting brackets 20 to vehicle 12, are also used for fixedly coupling cylinder brace 32 to support member 30. Each mounting bracket 20 can also include an L-shaped angle iron 33 which is optionally coupled between support member 30 and beam 15 via fasteners 22.

As seen in FIG. 4, support member 30 is substantially L-shaped as viewed from its side and is constructed of a rigid, metallic material such as steel. Support member 30 basically includes a pair of elongated structural beams 34, a mounting plate 36, an end plate 38, a first pair of gussets 40a coupled between structural beams 34 and mounting plate 36, and a second pair of gussets 40b coupled between structural beams 34 and end plate 38.

Structural beams 34 are preferably fabricated from steel tubing having a substantially rectangular cross section. Each of the structural beams 34 has a first end 42 rigidly and fixedly coupled to mounting plate 36 and a second end 44 rigidly and fixedly coupled to end plate 38. Preferably, each of the structural beams 34 are welded to mounting plate 36 and end plate 38 such that structural beams 34 are substantially parallel to each other. A plurality of mounting holes 46 extend through each of the structural beams 34 for receiving fasteners 22 therein. Each of the structural beams 34 should have at least two mounting holes 46, and preferably three mounting holes 46, formed therein.

Preferably, structural beams 34 are fabricated from 2 inch by 2 inch by ¼ inch steel tubing. Of course, it will be apparent to those skilled in the art from this disclosure that structural beams 34 can have other tubular shapes as well as other non-tubular shapes. For example, each structural beam 34 could be configured as an eye beam, a C-shaped channel bar, an L-shaped channel bar or other structurally sound shapes. Moreover, structural beams 34 could be constructed as solid rods of a variety of cross sections. Of course, a solid rod would be more expensive than utilizing steel tubing, channel bar or the like. For purposes of this application and the appended claims, structural beams, as used herein, refers to an elongated member having any structural shape, except for a thin plate with a thickness of approximately ¼ inch thick or less.

Again referring to FIG. 4, mounting plate 36 is preferably a substantially flat rectangular plate having a plurality of holes 48 for receiving fasteners 22 therethrough. Mounting plate 36 is designed to be vertically mounted on one of the main longitudinally extending beams 15 of vehicle 12. Mounting plate 36 extends substantially perpendicular to the longitudinal axes of structural beams 34. Mounting plate 36 is sized to accommodate cylinder brace 32 as discussed below. Mounting plate 36 is preferably a steel plate which is 6 inches wide, 15 inches long and ¼ inch thick.

End plate 38 is also preferably constructed of a steel plate, but is attached to second ends 44 of structural beams 34. End plate 38 is preferably 6 inches wide, 6 inches long and ⅛ inch thick. Preferably, end plate 38 is welded to second ends 44 of structural beams 34 such that end plate 38 extends substantially perpendicular to the longitudinal axes of structural beams 34 and extends substantially parallel to mounting plate 36. End plate 38 is designed to be coupled to the body skirt 18 of vehicle 12 by fasteners 50. While fasteners 50 are illustrated as nuts and bolts, it will be apparent to those skilled in the art that end plate 36 could be either welded to body skirt 18 of vehicle 12 or attached to body skirt 18 with other types of fasteners.

When fasteners 50 are used, a pair of holes are drilled through body skirt 18 and into end plate 38 after structural beam 34 and/or mounting plate 36 are attached to vehicle 12. In this manner, the installer can simultaneously drill the holes in body skirt 18 as well as a pair of holes 54 in end plate 38 such that holes 54 of end plate 38 are aligned with the holes formed in body skirt 18 of vehicle 12. Moreover, in a P-50 step or bread van style vehicle, the heads of fasteners 50 would most likely align with the heads of other bolts that are visible from the exterior or vehicle 12. Of course, holes 54 could be pre-drilled in end plate 38, if needed or desired.

Figure 8:
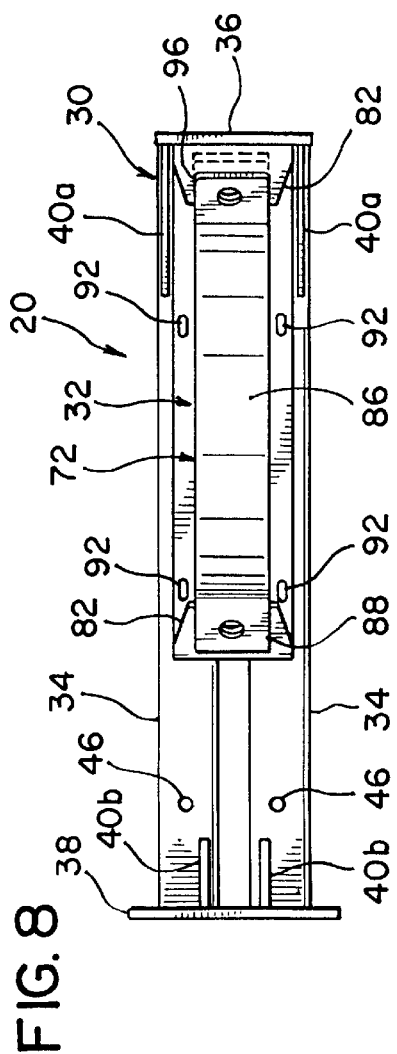
FIG. 8 is a bottom plan view of the mounting bracket illustrated in FIGS. 5–7 with one of the cylinder braces removed.

For added strength, two gussets or plates 40a are coupled between structural beams 34 and mounting plate 36. Likewise, two gussets or plates 40b are coupled between structural beams 34 and end plate 38 as best seen in FIGS. 4 and 8. Gussets 40a and 40b are preferably constructed between ⅛ inch steel plates which are welded between structural beams 34 and mounting plate 36 and end plate 38, respectively.

As best seen in FIGS. 5–8, cylinder brace 32 is preferably a two-piece assembly having a first part releasably coupled to a second part by conventional fasteners 64 such as nuts and bolts. First part of cylinder brace 32 includes a base 70 with a first clamping band or strap 72 fixedly coupled thereto, while second part basically includes a second clamping band or strap 74. First part and second part are both preferably constructed of sheet metal bent to its desired configuration.

Cylinder brace 32 as shown in the drawings is manufactured by Pressed Steel Tank Company, Inc. Of course, it will be apparent to those skilled in the art from this disclosure that other types of cylinder braces could be utilized with certain modifications to the mounting assemblies 10 according to the present invention.

Gaskets or liners 66 are utilized between clamping bands 72 and 74 and compressed natural gas cylinder 14 as required by code. Preferably, liners 66 are constructed from extruded neoprene or EPDM. It is important that clamping bands 72 and 74 do not directly contact the exterior of compressed natural gas cylinder 14.

Base 70 is bent to a somewhat L-shaped configuration and has a first plate 76 for coupling to structural beams 34 via fasteners 22, a second plate 78 for coupling to mounting plate 36 via fasteners 22, and a connecting plate 80 interconnecting first and second plates 76 and 78. The free ends of first and second plates 76 and 78 are bent to form a pair of mounting tabs 82. Mounting tabs 82 each have a mounting hole for receiving one of the fasteners 64 therethrough.

First clamping band 72 is preferably fixedly coupled to first and second plates 76 and 78 as well as to mounting tabs 82. In particular, clamping band 72 is preferably welded to plates 76 and 78 as well as to mounting tabs 82. Clamping band 72 preferably has a curved portion 86 with its free ends bent outwardly to form a pair of mounting flanges 88. Each of the flanges 88 has a mounting hole formed therein and aligned with its respective mounting hole of mounting tab 82 for receiving one of the fasteners 64 therethrough.

Plates 76 and 78 each have four mounting slots 92 extending therethrough which align with mounting holes 46 and 48 of structural beams 34 and mounting plate 36, respectively. More specifically, base 70 is secured to structural beams 34 and mounting plate 36 via fasteners 22.

Second clamping band 74 is similar to first clamping band 72, and is constructed of sheet metal material. Second clamping band 74 includes a curved portion 94 with its free ends bent outwardly to form a pair of mounting flanges 96. Each of the mounting flanges 96 has a mounting hole extending therethrough for receiving one of the fasteners 64 therein.

Installation

To install compressed natural gas cylinder 14 to the underside of vehicle 12, the installer first must determine the location for the compressed natural gas cylinder 14. Once the location is determined, the installer will most likely have to remove portions of one or more cross members 16 to accommodate compressed natural gas cylinder 14. In particular, removal of one or more of the cross members 16 of vehicle 12 will increase the road clearance between compressed natural gas cylinder 14 and the road. Of course, it may be possible that for certain vehicles, the cross members would not interfere with the installation of compressed natural gas cylinder 14, and thus, would not need a portion to be cut away.

Next, the locations of support members 30 are determined. Support members 30 are then placed against the floor or bed 17 of vehicle 12 such that structural beams 34 engage the floor or bed 17 of vehicle 12 and mounting plates 36 engage one of the main longitudinally extending beams 15. Then, holes are drilled into the floor or bed 17 of vehicle 12 as well as into one of the main longitudinal beams 16 of vehicle 12. This can be done by holding support members 30 in place and then marking the location for drilling the holes in bed 17 and beam 15. Alternatively, the support members 30 can be temporarily secured to beam 15 for drilling through holes 46 in structural beams 34 and through holes 48 in mounting plates 36. In either case, support members 30 can be used to ensure the correct placement of the holes in the bed 17 and main longitudinally extending beam 15 of vehicle 12 relative to support members 30. Once these holes are drilled, fasteners 22 are inserted through slots 92 in plates 76 and 78 and through holes 46 in structural beams 34 and holes 48 in mounting plate 36. The fasteners 22 are then inserted through holes previously drilled in vehicle 12 and then tightened down to secure support members 30 to vehicle 12.

Now, the installer can drill through the body skirt 18 of vehicle 12 and into end plates 38 to fixedly secure the body skirt 18 to mounting assemblies 10. In particular, the body skirt 18 of vehicle 12 and end plates 38 are coupled together by fasteners 50. Shims (not shown) may be positioned between body skirt 18 of vehicle 12 and end plates 38 to eliminate any gap therebetween.

Once the support members 30, together with the first parts of cylinder braces 32, are coupled to vehicle 12, the next step is to install compressed natural gas cylinder 14 against curved portions 86 of clamping bands 72 with liners 66 positioned therebetween. Finally, fasteners 64 are inserted through the holes formed in flanges 88 and 96 of the clamping bands 72 and 74 to fixedly secure compressed natural gas cylinder 14 to mounting assembly 10.

It is important to note that bracket assemblies 20 should be located as near to the end of compressed natural gas cylinder 14 as is reasonably possible. Moreover, a minimum of two mounting assemblies 20 are required according to code for the cylinder. However, a third mounting bracket should not be mounted in the center of the cylinder, since this could create a fulcrum point causing improper stresses to develop on the cylinder due to the flexing characteristics of the vehicle frame. Instead, mounting assemblies 20 should always be utilized in sets. For example, a pair of mounting assemblies 20 could be mounted at each end of compressed natural gas cylinder 14.

Mounting Assembly 110

Referring now to FIG. 8, a mounting assembly 110 in accordance with a second embodiment of the present invention is illustrated. Mounting assembly 110 is substantially identical to mounting assembly 10, discussed above, except that mounting assembly 110 has been modified to be adjustable. In particular, since manufacturing tolerances are such that each vehicle of the same type may be slightly different, mounting assembly 110 is constructed to adjust for such differences in the same type of vehicle. In other words, instead of using shims, mounting assembly 110 has a built-in adjustability feature.

In view of the similarities between mounting assembly 110 and mounting assembly 10, discussed above, mounting assembly 110 will not be discussed or illustrated in detail herein. Rather, mounting assembly 110 will only be briefly discussed and illustrated herein.

Mounting bracket 120 is fixedly coupled to the underside of vehicle 12 via fasteners 22 in substantially the same manner as discussed above in the first embodiment. Mounting bracket 120 includes a support member 130 for improving the structural integrity of the frame and body of vehicle 12, and cylinder brace 32, discussed above, for securing compressed natural gas cylinder 14 to support member 130. Preferably, fasteners 22, which are utilized to couple mounting bracket 120 to vehicle 12, are also used for fixedly coupling cylinder brace 32 to support member 130.

As seen in FIG. 8, support member 130 is substantially L-shaped as viewed from its side and is constructed of a rigid, metallic material such as steel. Support member 130 basically includes a pair of extendible structural beams 134, a mounting plate 136, an end plate 138, a pair of gussets 140a coupled between structural beams 134 and mounting plate 136, and a pair of gussets 140b coupled between structural beams 134 and end plate 138.

Structural beams 134 are preferably fabricated from steel tubing having a substantially rectangular cross section. Each of the structural beams 134 has an outer portion 134a and an inner portion 134b. Inner portions 134b are telescopically received within outer portions 134a. Each of the outer portions 134a has a first end 142b rigidly and fixedly coupled to mounting plate 136 and a second end 144a slideably receiving first end 142b of inner portion 134b. Second ends 144b of inner portions 134b are rigidly and fixedly coupled to end plate 138. A plurality of mounting holes 146 extend through each of the structural beams 134 for receiving fasteners 22 therein. Each of the structural beams 134 should have at least two mounting holes 146, and preferably three mounting holes 146 formed therein.

Mounting plate 136 is preferably a substantially flat rectangular plate having a plurality of holes 148 for receiving fasteners 22 therethrough. Mounting plate 136 is designed to be vertically mounted on one of the main longitudinally extending beams 16 of vehicle 12. Mounting plate 136 extends substantially perpendicular to the longitudinal axes of structural beams 134. Mounting plate 136 is sized to accommodate cylinder brace 32 as discussed above in the first embodiment. Mounting plate 136 is preferably a steel plate which is 6 inches wide, 15 inches long and ¼ inch thick.

End plate 138 is also preferably constructed of a steel plate, but is preferably 6 inches wide, 6 inches long and ⅛ inch thick. Preferably, end plate 138 is welded to second ends 144b of inner portions 134b of structural beams 134 such that end plate 138 extends substantially perpendicular to the longitudinal axes of structural beams 134 and extends substantially parallel to mounting plate 136. End plate 138 is designed to be coupled to the body skirt 18 of vehicle 12 by fasteners 50 as discussed above. While fasteners 50 are illustrated as nuts and bolts, it will be apparent to those skilled in the art that end plate 136 could be either welded to body skirt 18 of vehicle 12 or attached to body skirt 18 with other types of fasteners.

For added strength, a first pair of gusset plates 140a are fixedly coupled between outer portions 134b of structural beams 134 and mounting plate 136 as well as a second pair of gusset plates 140b are fixedly coupled between inner portions 134b of structural beams 134 and end plate 138. Gussets 140a and 140b are preferably constructed between ⅛ inch steel plates which are welded between structural beams 134 and mounting plate 136 and end plate 138, respectively.

While two advantageous embodiments have been chosen to illustrate the invention, it will be understood by those skilled in the art that various changes and modifications can be made herein without departing from the scope of the invention as defined in the appended claims.

What is claimed is:

1. A natural gas cylinder mounting assembly for supporting a natural gas cylinder coupled to an underside of a vehicle, comprising:

a first support member adapted to be coupled to the underside of the vehicle, said first support member including a first structural beam having a first end and a second end with a first longitudinal axis extending therebetween, and a first mounting member rigidly coupled to said first end of said first structural beam and extending substantially perpendicular to said first structural beam, said first structural beam having a first attachment portion, a second attachment portion and a third portion extending between said first and second attachment portions of said first structural beam for spacing said first and second attachment portions at least greater than one-quarter of an inch apart from each other;

a first cylinder brace rigidly coupled to said first attachment portion of said first support member, said first cylinder brace including a pair of first clamping bands with curved surfaces which engage a first end of the natural gas cylinder;

a second support member adapted to be coupled to the underside of the vehicle, said second support member including a second structural beam having a first end and a second end with a second longitudinal axis extending therebetween, and a second mounting member rigidly coupled to said first end of said second structural beam and extending substantially perpendicular to said second structural beam, said second structural beam having a first attachment portion, a second attachment portion and a third portion extending between said first and second attachment portions of said second structural beam for spacing said first and second attachment portions at least greater than one-quarter of an inch apart from each other; and a second cylinder brace rigidly coupled to said first attachment portion of said second support member, said second cylinder brace including a pair of second clamping bands with curved surfaces which engage a second end of the natural gas cylinder, each of said first and second structural beams having a transverse cross-sectional shape other than a thin flat plate with overall thicknesses less than one-quarter of an inch as measured in a direction substantially perpendicular to said first and second longitudinal axes of said first and second structural beams, respectively, and in a direction substantially parallel to longitudinal axes of said first and second mounting members, respectively.

2. A natural gas cylinder mounting assembly, according to claim 1, wherein:

said first support member further includes a first end member fixedly coupled to said second end of said first structural beam; and said second support member further includes a second end member fixedly coupled to said second end of said second structural beam.

3. A natural gas cylinder mounting assembly for supporting a natural gas cylinder coupled to an underside of a vehicle, comprising:

a first support member adapted to be coupled to the underside of the vehicle, said first support member including a first structural beam having a first end and a second end with a longitudinal axis extending therebetween, and a first mounting member rigidly coupled to said first end of said first structural beam and extending substantially perpendicular to said first structural beam;

a first cylinder brace rigidly coupled to said first support member, said first cylinder brace including a pair of first clamping bands with curved surfaces which engage a first end of the natural gas cylinder;

a second support member adapted to be coupled to the underside of the vehicle, said second support member including a second structural beam having a first end and a second end with a longitudinal axis extending therebetween, and a second mounting member rigidly coupled to said first end of said second structural beam and extending substantially perpendicular to said second structural beam; and a second cylinder brace rigidly coupled to said second support member, said second cylinder brace including a pair of second clamping bands with curved surfaces which engage a second end of the natural gas cylinder, said first and second structural beams being tubular members with rectangular transverse cross-sections.

4. A natural gas cylinder mounting assembly for supporting a natural gas cylinder coupled to an underside of a vehicle, comprising:

a first support member adapted to be coupled to the underside of the vehicle, said first support member including a first structural beam having a first end and a second end with a longitudinal axis extending therebetween, and a first mounting member rigidly coupled to said first end of said first structural beam and extending substantially perpendicular to said first structural beam;

a first cylinder brace rigidly coupled to said first support member, said first cylinder brace including a pair of first clamping bands with curved surfaces which engage a first end of the natural gas cylinder;

a second support member adapted to be coupled to the underside of the vehicle, said second support member including a second structural beam having a first end and a second end with a longitudinal axis extending therebetween, and a second mounting member rigidly coupled to said first end of said second structural beam and extending substantially perpendicular to said second structural beam; and a second cylinder brace rigidly coupled to said second support member, said second cylinder brace including a pair of second clamping bands with curved surfaces which engage a second end of the natural gas cylinder, each of said support members including an additional structural beam with a first end coupled to its respective said mounting member and a second end with a second longitudinal axis extending therebetween.

5. A natural gas cylinder mounting assembly according to claim 4, wherein:

said structural beams are tubular members with rectangular transverse cross-sections.

6. A natural gas cylinder mounting assembly according to claim 4, wherein:

said first support member further includes a first end member fixedly coupled to said second end of said first structural beam; and said second support member further includes a second end member fixedly coupled to said second end of said second structural beam.

7. A natural gas cylinder mounting assembly according to claim 6, wherein:

an angle member is fixedly coupled between said structural beams and its respective said mounting member.

8. A natural gas cylinder mounting assembly according to claim 7, wherein:

a first angle member is fixedly coupled between said first end member and said first structural beam; and a second angle member is fixedly coupled between said second end member and said second structural beam.

9. A natural gas cylinder mounting assembly according to claim 8, wherein:

each of said structural beams includes an inner portion slideably coupled to an outer portion prior to attachment to the underside of the vehicle.

10. A mounting bracket for supporting a compressed gas cylinder coupled to an underside of a vehicle, comprising:

a support member adapted to be coupled to the underside of the vehicle, said support member including a first structural beam having a first end and a second end with a longitudinal axis extending therebetween, and a first mounting member rigidly coupled to said first end of said first structural beam and extending substantially perpendicular to said first structural beam, said first structural beam having a first attachment portion, a second attachment portion and a third portion extending between said first and second attachment portions for spacing said first and second attachment portions at least greater than one-quarter of an inch apart from each other; and a cylinder brace rigidly coupled to said first attachment portion of said support member, said cylinder band including a pair of clamping bands with curved surfaces which engage the compressed gas cylinder, said first structural beam having a transverse cross-sectional shape other than a thin flat plate with overall thicknesses less than one-quarter of an inch as measured in a direction substantially perpendicular to said longitudinal axis of said first structural beam, and in a direction substantially parallel to longitudinal axes of said first mounting member.

11. A mounting bracket according to claim 10, wherein said support member further includes a first end member fixedly coupled to said second end of said first structural beam.

12. A mounting bracket according to claim 10, wherein:

said first structural beam is a tubular member with a rectangular transverse cross-section.

13. A mounting bracket according to claim 10, wherein:

a first angle member is fixedly coupled between said first end member and said first structural beam.

14. A mounting bracket according to claim 10, wherein:

an angle member is fixedly coupled between said first structural beam and said first mounting member.

15. A mounting bracket for supporting a compressed gas cylinder coupled to an underside of a vehicle, comprising:

a support member adapted to be coupled to the underside of the vehicle, said support member including a first structural beam having a first end and a second end with a first longitudinal axis extending therebetween, and a first mounting member rigidly coupled to said first end of said first structural beam and extending substantially perpendicular to said first structural beam; and a cylinder brace rigidly coupled to said support member, said cylinder brace including a pair of clamping bands with curved surfaces which engage the compressed gas cylinder, said support member further including an additional structural beam with a first end coupled to said mounting member and a second end with a second longitudinal axis extending therebetween.

16. A mounting bracket for supporting a compressed gas cylinder coupled to an underside of a vehicle, comprising:

a support member adapted to be coupled to the underside of the vehicle, said support member including a first structural beam having a first end and a second end with a longitudinal axis extending therebetween, and a first mounting member rigidly coupled to said first end of said first structural beam and extending substantially perpendicular to said first structural beam; and a cylinder brace rigidly coupled to said support member, said cylinder brace including a pair of clamping bands with curved surfaces which engage the compressed gas cylinder, said first structural beam including an inner portion slideably coupled to an outer portion prior to attachment to the underside of the vehicle.

17. A method of attaching a compressed gas cylinder to an underside of a vehicle with at least one longitudinally extending main beam and at least one transversely extending cross beam supporting a vehicle body, the method comprising the steps of:

removing a portion of the cross beam for providing space to mount the compressed gas cylinder;

attaching a mounting assembly to the main beam and the vehicle body which increases the rigidity of the vehicle to compensate for the removed portion of the cross beam, the step of attaching the mounting assembly including the steps of:

coupling a first structural beam to the underside of the vehicle, the first structural beam having a first end and a second end with a longitudinal axis extending therebetween, coupling a first mounting member to the main beam of the vehicle adjacent the first end of the first structural beam and extending substantially perpendicular to the first structural beam;

coupling a first part of a first cylinder brace between the first structural beam and the first mounting member;

coupling a second structural beam to the underside of the vehicle, the second structural beam having a first end and a second end with a longitudinal axis extending therebetween, coupling a second mounting member to the main beam of the vehicle adjacent the first end of the second structural beam and extending substantially perpendicular to the second structural beam;

coupling a first part of a second cylinder brace between the second structural beam and the second mounting member, placing the compressed gas cylinder against the first parts of the first and second clamping braces;

coupling a second part of the first cylinder brace to the first part of the first cylinder brace to engage a first end of the compressed gas cylinder; and coupling a second part of the second cylinder brace to the first part of the second cylinder brace to engage a second end of the compressed gas cylinder.

18. A method according to claim 17, further comprising the steps of:

coupling the first structural beam to the first mounting member, and coupling the second structural beam to the second mounting member.

19. A method according to claim 18, wherein:

the steps of coupling the first and second structural beams to the first and second mounting members are performed prior to the steps of coupling the first and second structural beams to the underside of the vehicle and coupling the first and second mounting members to the main beam.

20. A method according to claim 19, further comprising the steps of:

coupling at least one gusset between each of the first and second structural beams and the first and second mounting members, respectively;

prior to the steps of coupling the first and second structural beams to the underside of the vehicle and coupling the first and second mounting members to the main beam.

21. A method according to claim 19, further comprising the steps of:

coupling a first end member to the second end of the first structural beam;

coupling a second end member to the second end of second structural beam; and coupling the first and second end members to the vehicle body.

22. A method according to claim 21, further comprising the steps of:

longitudinally expanding the first and second structural beams.

23. A method according to claim 22, further comprising the steps of:

coupling at least one gusset between each of the first and second structural beams.

* * * * *